Nov. 5, 1935. L. E. ZERBE ET AL 2,019,755
ROTARY MACHINE TORQUE INDICATOR AND SHOCK ABSORBER
Filed Sept. 12, 1932 2 Sheets-Sheet 1
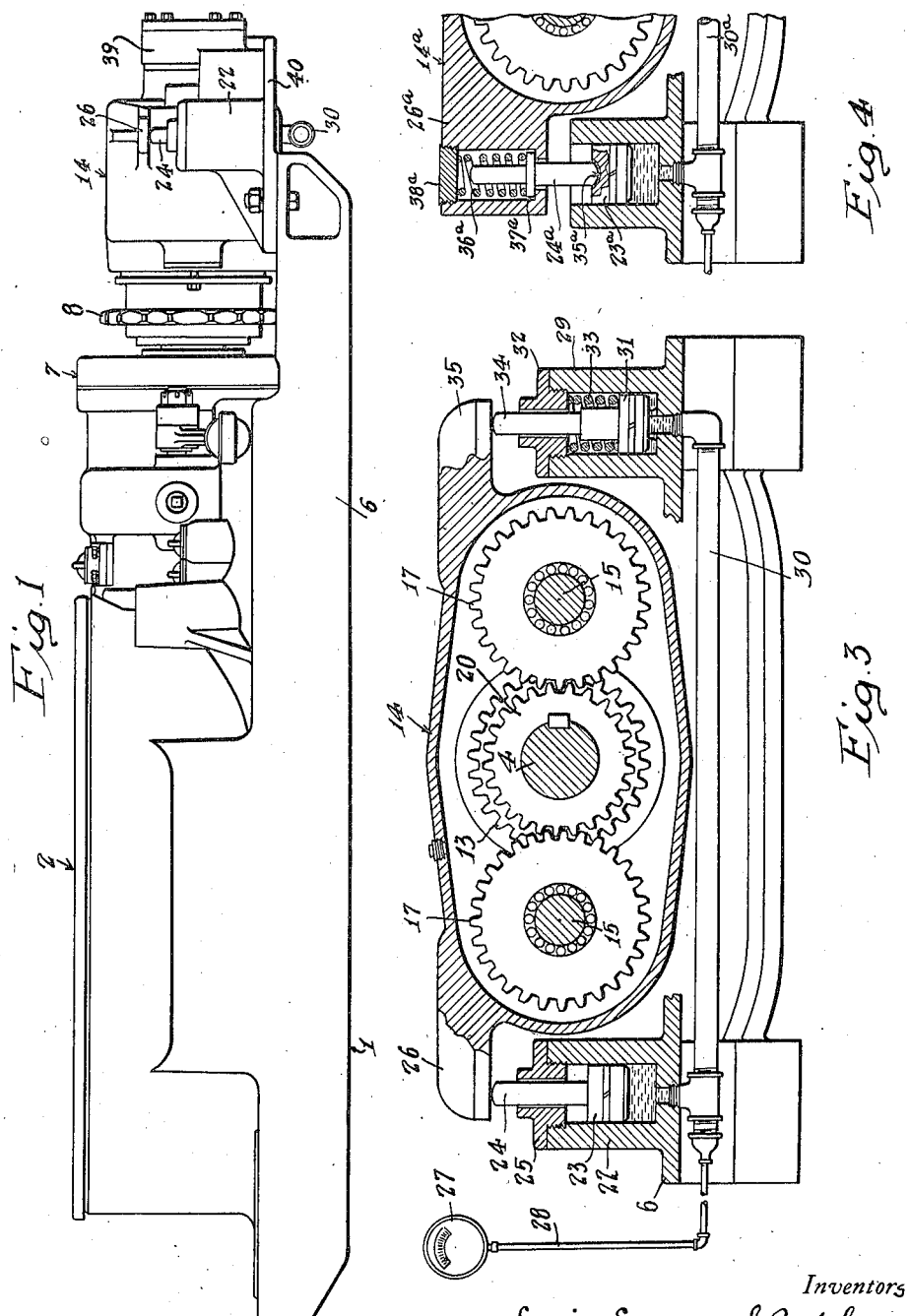
Inventors
Lewis Emanuel Zerbe
Allen Erwin Rice
By Lyon & Lyon
Attorneys

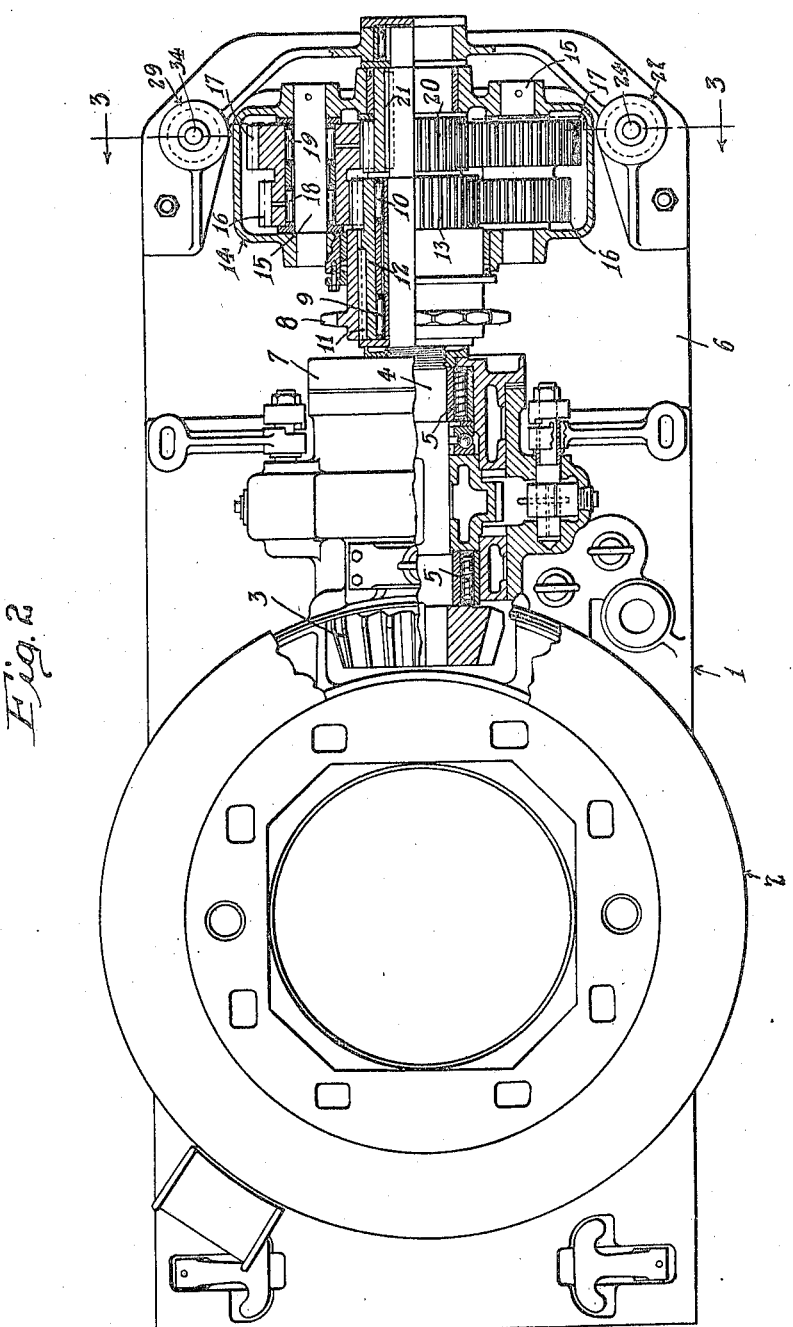

Patented Nov. 5, 1935

2,019,755

UNITED STATES PATENT OFFICE 2,019,755

ROTARY MACHINE TORQUE INDICATOR AND SHOCK ABSORBER

Lewis Emanuel Zerbe, Moneta, and Allen Erwin Rice, Palos Verdes, Calif., assignors, by mesne assignments, to The National Superior Company, Toledo, Ohio, a corporation of Delaware Application September 12, 1932, Serial No. 632,770

11 Claims. (Cl. 265—25)

This invention relates to rotary drilling machines as used in well boring practice, and more particularly to a rotary machine having means for measuring the torque transmitted through the rotary machine to the drill pipe, and having incorporated therein means for absorbing shocks transmitted from the rotary machine through and to the drive thereof.

In the drilling of wells, particularly oil wells, where the drill holes are carried to relatively great depths, and wherein the holes are drilled by means of bits or drills suspended upon the end of drill stems, very extensive development has taken place to provide means wherein the weight of the drill stems as imposed upon the drilling bit during the drilling operations can be proportioned to or with the torque applied to the drill stems to rotate the same.

As conditions met during the drilling of such wells vary, it is important to avoid twisting off the drill stem and to obtain the most effective drilling operations, to vary the proportion of load imposed with relation to the force applied to rotate the drill stem.

Many forms of weight indicating devices have been placed in use and devices for proportioning the torque to the weight in the rotary drilling operation are disclosed in patents for example issued to Lewis E. Zerbe and M. T. Archer, Nos. 1,667,181 and 1,785,238. As the apparatus disclosed in these patents is expensive, many operators at the present time are employing only weight-indicating and recording devices for measuring the weight of the drill pipe resting on the drill bit. The application of the torque indicating device to a rotary drilling machine on a drilling rig having only a weight indicator thereon will permit the operator to know both the load on the bit and also the torque transmitted to the bit through the drill pipe.

It is therefore an object of this invention to provide a rotary machine having means therein for indicating the torque being applied or transmitted thereby to the bit through the drill stem.

Another object of this invention is to provide a rotary machine having a torque indicating means in combination with a shock absorbing means for minimizing the shock loads transmitted through the gears and shafting of the rotary drilling machine.

Another object of this invention is to provide a rotary machine having a planetary gear drive mechanism including means which are operable through the torque reaction applied to the rotary machine to the drive means for indicating the torque applied to the rotary machine.

Other objects and advantages of this invention it is believed will be apparent from the following detailed description of a preferred embodiment thereof as illustrated in the accompanying drawings.

In the drawings:

Figure 1 is a side elevation of a rotary machine embodying our invention.

Figure 2 is a top plan view thereof partly in horizontal section.

Figure 3 is a sectional end view taken substantially on the line 3—3 of Figure 2.

Figure 4 is a fragmental sectional view of a modified form of the structure embodied in our invention.

In the preferred embodiment of our invention as illustrated in the accompanying drawings, I indicates the base of a rotary machine which is herein illustrated as of the conventional type commonly employed in the drilling of wells, particularly oil wells, the specific construction of which is more fully set forth and described in the copending application, Serial No. 504,758, filed by D. S. Faulkner, A. E. Rice and L. E. Zerbe. The particular form of rotary machine and its construction is, however, not important to this invention as this invention is applicable to any type or form of rotary machine having any type or construction of drive.

The conventional rotary machine as illustrated includes a rotary table 2 which is rotatably supported on the base 1 and is provided with gear teeth which mesh with a drive pinion 3 secured to a pinion or gear shaft 4. The shaft 4 is rotatably supported in bearings 5 upon the base 1 on the extension 6 of said base 1 within a housing 7. The outer end of the shaft 4 is supported in a bearing 39 positioned on the pedestal 40 which is detachably positioned on the base extension 6.

Mounted upon projecting or outboard portion of the shaft 4 is a drive sprocket 8. The sprocket 8 is rotatably supported with relation to the shaft 4 on bearings 9 and 10. The sprocket 8 is keyed by means of a key 11 to a sleeve 12 which is interposed between the elongated hub of the sprocket 8 and the bearings 9 and 10. Formed integral with the sleeve 12 are gear teeth 13 forming a drive pinion driven by the sprocket 8. A planetary gear housing 14 is rotatably mounted with relation to the shaft 4 and supports a pair of diametrically opposed planet gear shafts 15. Within the housing 14 are planet gears 16 and 17.

Planet gears 16 and 17 are journaled on the shafts 15 on roller bearings 18 and 19 respectively. The planet gears 16 mesh with the gear 13 and are driven thereby, and the planet gears 17 mesh with a gear 20 which is keyed by means of a key 21 to the shaft 4.

The planetary gear housing 14 is journaled at one end on the hub extension of the sprocket 8 and at its other end upon the hub extension of the gear 20. In operation the housing 14 is maintained relatively stationary in a manner as will hereinafter be fully described.

With the sprocket 8 driven at a suitable speed, the gear 13 rotates at the same speed. The gear 13 meshes with the gear 16 and rotates the gear 16 at a relative speed which is inversely proportional to the pitch diameters of the two meshing gears. Planet gear 17 is integral with the planet gear 16 and therefore rotates at the same speed as the planet gear 16 and drives the meshing gear 20 which is keyed to the shaft 4. With the proportion of gears as illustrated in the drawings, the pinion shaft 4 is rotated at a speed slightly in excess of the speed of rotation of the drive means or sprocket 8.

Employing a gear drive of the foregoing character permits measuring the torque transmitted from the source of power to the pinion shaft 4. In operation the pinion shaft with its gear 20 and also the drive sprocket 8 with its gear 13 rotate in a counter clockwise direction, that is, looking in the direction of Figure 3.

Consequently, the two sets of planet gears 16 and 17 rotate in a clockwise direction. The tooth reaction to the gear 13 in driving the planet gear 16 tends to rotate the housing 14 in a counter clockwise direction in the absence of any means to hold the housing relatively stationary. The tooth reaction to the planet gear 17 in driving the pinion shaft gear 20, tends to rotate the housing 14 in a clockwise direction. With the gear proportions used, the tooth pressure between gears 20 and 17 is less than that between gears 13 and 16, consequently the resultant force or differential of these two pressure reactions is the force that tends to rotate the housing 14 in a counter clockwise direction. The differential in the reaction referred to is always proportional to the torque being transmitted or the torque reaction applied from the rotary table to the drive means.

In order to measure the torque thus applied, we prefer to provide the following means:

A fluid cylinder 22 is provided within the pedestal 40 mounted on the base extension 6 and mounted within the fluid cylinder 22 is a piston 23. The piston 23 is provided with a piston stem 24 which projects through the cap 25 of the cylinder 22.

A fluid preferably of a comparatively non-compressible character is mounted within the cylinder 22 below the piston 23. Formed preferably integral with the housing 14 is an engaging stop or member 26 which projects into position to engage the end of the stem 24 of the piston 23. A gauge 27 is connected through a conduit 28 with the fluid within the cylinder 22. The gauge 27 may be calibrated to read directly in foot pounds or in other suitable or desirable units for designating the torque transmitted through the rotary machine for rotating the drill pipe. In this manner the fluid within the cylinder 22 acting against the piston 23 holds the housing 14 from rotation around the shaft 4.

In order to absorb shock loads which may be transmitted back from the rotary table 2 to the drive gears of the driving mechanism of the rotary machine, we prefer to provide the following means:

Formed preferably integral with pedestal or bearing support 40 is a second fluid cylinder 29 which is connected by means of a connecting pipe 30 with a fluid within the cylinder 22. A piston 31 is mounted within the cylinder 29 to act against the fluid therein.

A cylinder cap 32 is provided for the cylinder 29 and a spring 33 is interposed between the cap 32 and the piston 31. The stem 34 of the piston 31 projects through the cap 32 to engage a stop projection 35 similar to the stop projection 26 of the housing 14. In this manner any pressure transmitted to the fluid system thus described from any external force applied to the piston 23 will also act against the face of the piston 31 and tend to force the same upwardly as the piston 23 is forced downwardly. The spring 33, however, is calibrated to resist any deformation within the normal range of power that is usually required for driving the rotary machine. However, in case of any shock load being encountered such, for example, as encountered when the drilling bit secured to the drill stem becomes stuck so that the shock load exceeds the normal load, the fluid pressure in the conduit 30 would be sufficient to exert enough pressure on the piston 31 to cause a deflection in the spring 33 and consequently allow a slight rotation of the housing 14 about its axis on the pinion shaft 4. Any movement of the piston 31 is represented by an opposite movement of the piston 23. The spring 33, therefore, permits a resilient action which will greatly minimize the effect of shock loads on the gears of the drive mechanism and on the entire rotary machine as a whole.

In the modified form of our invention as illustrated in Figure 4, similar parts have been designated by the similar numerals with the addition of an exponent "$a$".

The object of this modification is to provide a resilient action between projection $26^a$ and the housing $14^a$ and the piston $23^a$ within the normal range of power usually transmitted by the rotary machine. The stem $24^a$ is assembled within a pocket in the projection $26^a$ which also encloses a spring $36^a$. The spring seats on a shoulder $37^a$ of the stem $24^a$ and against a plug $38^a$ screw-threaded in the end of the pocket of the projection $26^a$. With this construction the spring can be compressed to initial load and absorb any shock loads that may be transmitted through the torque indicating unit. With an overload beyond the capacity of the spring, the stem $24^a$ seats against the plug $38^a$ and completes a solid connection between the housing $14^a$ and the piston $23^a$. With the solid connection thus established when the torque transmitted exceeds the capacity of the spring $36^a$, the resilient action is then transferred automatically through the conduit $30^a$ to the piston mounted on the opposite side of the planetary gear mechanism to the spring mounted in this cylinder in which this piston is mounted, as described in connection with Figure 3.

The resilient connection between the piston $23^a$ and the housing $14^a$ will also operate to minimize any pressure waves that may be otherwise transmitted in the fluid system in the pipe $30^a$ incident to any shock loads from the torque indicating device. With such pressure waves avoided, the gauge 27 will more accurately indicate or record the actual torque being transmitted.

It is to be understood that the resilient means herein described can be modified so as to combine the resilient feature in a single unit that will operate throughout the entire range of power that will be transmitted, without departing from the spirit of this invention.

In the modification of Figure 4 the stem 24ª is mounted in a pocket 35ª formed in the upper end of the piston 23ª.

Having fully described our invention, it is to be understood that we do not wish to be limited to the details herein set forth, but our invention is of the full scope of the appended claims.

We claim:

1. In a transmission dynamometer, the combination of a driven shaft, a drive member rotatably mounted on said shaft, a drive gear non-rotatively secured to said drive member, a driven gear non-rotatively secured to said driven shaft, a member pivotally supported relative to the axis of said driven shaft, a pair of operatively connected pinions rotatively mounted on said member, one pinion of said pair meshing with the drive gear and the other pinion meshing with the driven gear, and means to indicate the torque reaction of said member incident to the driving of said driven shaft by said drive member.

2. In a transmission dynamometer, the combination of a driven member and a drive member, means to rotatively support one of said members on the other member, a drive gear non-rotatively secured to said drive member, a driven gear non-rotatively secured to said driven member, a pinion carrying member pivotally supported relative to the axis of said driven member, a pair of operatively connected pinions rotatively mounted on said carrying member, one pinion of said pair meshing with the drive gear and the other pinion meshing with the driven gear, and means to indicate the torque reaction of said pinion carrying member incident to the driving of said driven member by said drive member.

3. In a transmission dynamometer, the combination of a driven shaft, axially spaced bearings to rotatively support said shaft, a drive member rotatably mounted on said shaft between said bearings, a housing pivotally supported relative to the axis of said shaft and positioned between said bearings, a drive gear within said housing, said drive gear and said drive member being constrained to turn together, a driven gear non-rotatively secured to said driven shaft and positioned within said housing, a pair of operatively connected pinions rotatively mounted within said housing, one pinion of said pair meshing with the drive gear and the other pinion meshing with the driven gear, and means to indicate the torque reaction of said housing incident to the driving of said driven shaft by said drive member.

4. In a transmission dynamometer, the combination of a driven shaft, bearing means to support said shaft, a drive member rotatably mounted on said shaft, a drive gear on the drive member, a driven gear on the driven shaft, one gear being of larger diameter than the other, a housing pivotally supported relative to the axis of said shaft, a pair of operatively connected pinions rotatably mounted within said housing, said housing with the pinions assembled in position being adapted to be assembled axially of the shaft to a position where the drive and driven gears are enclosed within the housing and mesh with their respective complementary pinion, and means to indicate the torque reaction of said housing incident to the driving of said driven shaft by said drive member.

5. In a transmission dynamometer, the combination of a driven shaft, a drive member rotatably mounted on said shaft, a planetary gear mechanism, means for driving a member of the planetary gear mechanism from the drive member, means for driving the shaft in the same direction of rotation as the drive member from a second member of the planetary gear mechanism, and means operatively connected with the planetary gear mechanism to indicate the torque reaction thereof incident to the driving of said driven shaft by said drive member.

6. In a transmission dynamometer, the combination of a driven shaft, a drive member rotatably mounted on said shaft, a planetary gear housing pivotally supported relative to the axis of said shaft, a planet gear within said housing, means within the housing and secured to said drive member for driving said planet gear, a second planet gear within said housing adapted to be driven by said first planet gear, a drive gear secured to said driven shaft and driven from said second planet gear, and means operatively associated with the housing to indicate the torque reaction incident to the driving of said shaft by said drive member, said means including a cylinder, a piston within said cylinder, fluid means within the chamber defined by said cylinder and piston, and means to indicate the fluid pressure therein.

7. In a transmission dynamometer, the combination of a driven shaft, a drive member rotatably mounted on said shaft, a planetary gear housing pivotally supported relative to the axis of said shaft, a planet gear within said housing, means within the housing and secured to said drive member for driving said planet gear, a second planet gear within said housing having a pitch diameter greater than that of the first planet gear and adapted to be driven by said first planet gear, a drive gear secured to said driven shaft and driven by said second planet gear at an increased speed over that of the drive member and in the same direction of rotation as the drive member, and means operatively associated with the housing to indicate the torque reaction incident to the driving of said shaft by said drive member, said means including a cylinder, a piston within said cylinder, fluid means within the chamber defined by said cylinder and piston, and means to indicate the fluid pressure therein.

8. In a transmission dynamometer, the combination of a driven shaft, a drive member rotatably mounted on said shaft, bearing means to rotatably support said shaft, a planetary gear mechanism wholly supported by said shaft, means for driving a member of the planetary gear mechanism from the drive member, means for driving the shaft in the same direction of rotation as the drive member from a second member of the planetary gear mechanism, and means operatively connected with the planetary gear mechanism to indicate the torque reaction thereof incident to the driving of said driven shaft by said drive member.

9. In a transmission dynamometer, the combination of a driven shaft, a drive member rotatably mounted on said shaft, a planetary gear housing, a planet gear within said housing, gear means within the housing for driving the planet gear, means to non-rotatively connect said drive member and gear means including a sleeve portion, bearing means between said sleeve portion and said housing to pivotally support one end thereof, a second planet gear within said housing adapted to be driven by said first planet gear, a drive gear secured to said driven shaft and driven from said second planet gear in the same direction as the driven member, means including a bearing to pivotally support the other end of said housing on said shaft, and means operatively associated with the housing to indicate the torque reaction incident to the driving of said shaft by said drive member, said means including a cylinder, a piston within said cylinder, fluid means within the chamber defined by said cylinder and piston, and means to indicate the fluid pressure therein.

10. In a transmission dynamometer, the combination of a driven shaft, a drive sprocket rotatably mounted on said shaft, spaced bearings to rotatably support said shaft, a pedestal to support one of said bearings, a planetary gear housing pivotally supported relative to the axis of said shaft and positioned between said bearings, a pair of connected coaxially aligned planet gears rotatably supported within said housing and being of different pitch diameters, a gear within the housing and secured to said drive sprocket for driving one of said planet gears, a drive gear secured to said shaft and meshing the other planet gear of said pair to drive said shaft in the same direction of rotation as the drive member, and means operatively associated with the housing to indicate the torque reaction incident to the driving of said shaft by said drive sprocket, said means including a cylinder formed in said pedestal, a piston within said cylinder, fluid means within the chamber defined by said cylinder and piston, and means to indicate the fluid pressure therein.

11. In a transmission dynamometer, the combination of a driven shaft, a drive member rotatably mounted on said shaft, a drive gear non-rotatively secured to said drive member, a driven gear non-rotatively secured to said driven shaft, a member pivotally supported relatively to the axis of said driven shaft, a pair of operatively connected pinions rotatively mounted on said member, one pinion of said pair meshing with the drive gear and the other pinion meshing with the driven gear, means to indicate the torque reaction of said member incident to the driving of said driven shaft by said drive member, said means including a cylinder, a piston within said cylinder, fluid means within the chamber defined by said cylinder and piston and means to indicate the fluid pressure therein, a second cylinder, a piston mounted within said cylinder and cooperating with said cylinder to define a chamber in communication with the fluid means within the first named chamber, and resilient means acting on said second piston to yieldably oppose the movement of said piston by the pressure of the fluid means.

LEWIS EMANUEL ZERBE.
ALLEN ERWIN RICE.